United States Patent Office

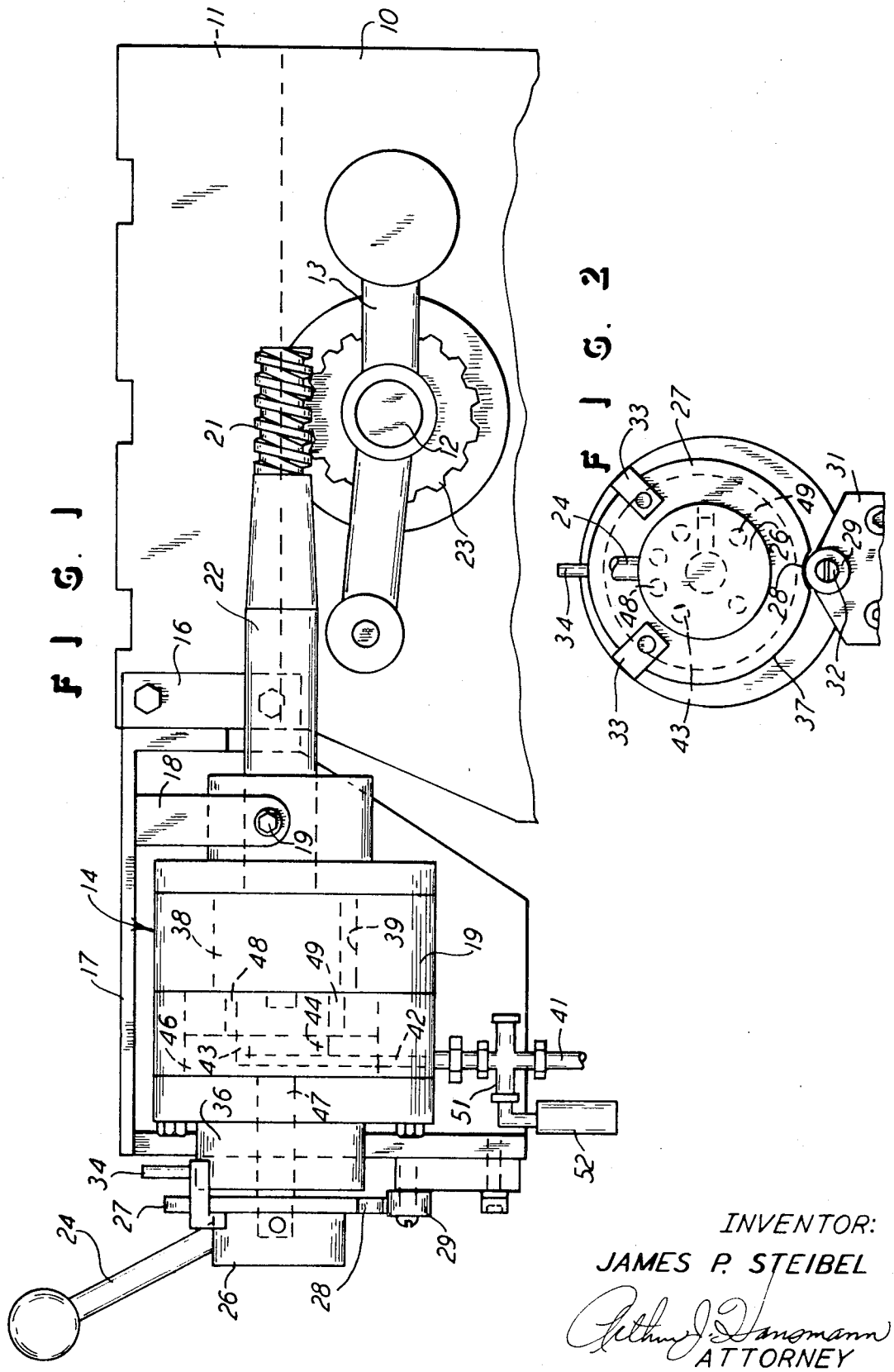

3,718,071
Patented Feb. 27, 1973

3,718,071
POWER FEED FOR THE TABLE OF A MACHINE TOOL OR THE LIKE
James P. Steibel, Sturtevant, Wis., assignor of a fractional part interest to Samuel J. Ashelford, Alexandria, Va.
Filed Oct. 29, 1971, Ser. No. 193,805
Int. Cl. B23c 9/00; B23q 5/26
U.S. Cl. 90—21.5                11 Claims

ABSTRACT OF THE DISCLOSURE

A power feed for the table of a machine tool which has rotatable shaft for moving the table. A power source is applied to the shaft through a drive member on the power source for engaging a driven member on the shaft, and thereby powering the table feed. The power source is shown pivotally mounted on the machine tool for engagement and disengagement of the drive member with the driven member so that the table can be either power driven, when the source is engaged, or it can be manually moved, when the power source is disengaged. A single control handle governs the pivotal action for the drive engagement mentioned, and the same single control handle governs the operation of the power source. The control handle has members connected thereto for effecting the pivotal action for drive engagement or disengagement, and the arrangement is such that the drive is engaged prior to the time that the power source is energized, such energizing being effected by movement of the handle beyond the position where the drive member is pivoted into engagement with the driven member.

---

This invention relates to a power feed for the table of a machine tool, and more particularly, it provides a powered means attachable to a machine tool which is provided with a manual control for movement of the machine tool table, and the power means can be engaged for overriding the manual control, as desired.

BACKGROUND OF THE INVENTION

Machine tools, such as milling machines, by way of one example, are commonly provided with a manually operated crank attached to a shaft for moving the bed of the milling machine to a desired position. Further, the prior art is already aware of applying power sources to the machine tool for overriding the manual control mentioned. That is, power sources are already known and which are attached to the machine tool for selective operation of the power source and for the consequent power-driving of the machine tool table to effect the desired movement of the table.

However, the arrangement of power sources with machine tools, as heretofore known, have been cumbersome, expensive, and difficult to maneuver and control in that they require multiple movements for applying the power and for engaging the power source with the machine tool table drive members. These shortcomings of the prior art are more fully understood when one realizes that a machine tool provided with a manual table control should preferably be provided with a power source which readily and instantly overrides the manual control, at the selection of the operator, and the power source should operate in either a forward or a reversed drive direction, without requiring elaborate manipulation or a great deal of time and consideration on the part of the operator.

Accordingly, it is an object of this invention to provide a power source adaptable to a manual feed-type machine tool such that the power source can be easily and instantly engaged to override the manual feed, and the power source is arranged to operate in either the forward or the reverse direction for movement of the machine tool table, at the selection of the operator.

Another and more specific object of this invention is to provide a power source for moving the table of a machine tool and whereby only a single handle is required for the sequential functions of initially engaging the drive of the power source to the machine tool table and for subsequently energizing the power source for movement of the table.

Still another object of this invention is to accomplish the aforementioned object of a single handle control and with the control being fool-proof in the sense that the sequence of engagement of the drive of the power source to the table is automatic and beyond the discretion of the operator so that the drive will automatically first be engaged before the power source is energized, and the power source will automatically be de-energized before the drive is disengaged. Thereby, the operator cannot accidentally operate the power source prior to engaging its drive with the machine tool table, but the sequence must be in the order mentioned so that the parts are protected from damage and the operator is not subjected to surprise action of the equipment mentioned.

Other objects and advantages will become apparent upon reading the following description in light of the accompanying drawings.

BRIEF DESCRIPTION OF THE DRAWINGS

FIG. 1 is side elevational view of a fragment of a preferred embodiment of this invention mounted on the machine tool.

FIG. 2 is an axial end view of a fragment of the device shown in FIG. 1, and with the view being taken from the left hand end of FIG. 1.

DETAILED DESCRIPTION OF THE PREFERRED EMBODIMENT

The drawings show this invention as adapted to a milling machine which is shown by way of example. Thus the milling machine 10 has a bed which is indicated at 11 and which is movable under the influence and rotation of a shaft 12. A manually operable crank-type handle 13 is attached to the shaft 12 for rotating the latter and causing the back-and-forth movement of the machine tool table 11, all in a conventional well-known manner.

The present invention is related to a unitary assembly, generally designated 14, which is mounted on the machine tool 10 by means of a mounting bracket 16, for instance. The assembly 14 includes a fixedly positioned support 17 which has the yoke 18 depending therefrom for presenting a pivot bolt 19 or the like. Thus the bolt 19 presents a pivot axis which is fixed and which provides a pivot support for the unitary assembly of parts of the power source 19 and the drive member 21.

In the example shown, the power source 19 is a pneumatic motor, and the drive member 21 is a worm gear on the end of a shaft 22 extending from the air motor 19 and of course being rotatable for rotation of the worm gear 21. The worm gear 21 engages a driven member 23, which is a worm wheel on the shaft 12. It will therefore be understood that upon energizing the motor 19, the worm 21 is rotated and the worm wheel 23 rotates to in turn rotate the feed screw or shaft 12 and thereby displace the machine tool table 11. Further, it will be understood that the motor 19 can be driven in either direction of rotation of the shaft 22, so that bed 11 can be displaced either in a leftward or a rightward direction, as desired.

The pivot mounting 19 provides for selective engagement and disengagement of the worm 21 relative to the worm wheel 23. Of course in FIG. 1 the members are shown in the engaged position. However, upon pivoting the unitary assembly, the motor 19, and the drive member 21 in the counterclockwise direction about the pivot mounting 19, the worm 21 would be disengaged from the worm wheel 23.

Such engagement and disengagement is under the control of the operator and is effected by means of a single handle 24 included as part of the unitary assembly mentioned. Thus the handle 24 is operatively connected with the power source or pneumatic motor 19 to permit the operator to effect the up and down pivot action described and to control the flow of air relative to the motor 19 for energizing the latter. Thus the handle 24 is secured to a rotatable boss 26 which in turn is attached to a cam-type plate 27. Therefore, as best described in connection with FIG. 2, the handle 24 is fragmentarily shown, and it will be understood that rotating the handle 24 to either the left or right, from its upright position of FIG. 2, will cause a corresponding rotation of the boss 26 and the cam-type plate 27. The plate 27 is provided with a notch 28, and a roller 29 is mounted on a fixed plate 31 secured to the attachment mounting bracket 17. The roller 29 is in a fixed position relative to its mounting screw 32, such that, upon rotation of the plate 27, the notch 28 on the plate 27 is moved away from the roller 29. Such rotation will cause the plate 27 to be elevated, and this in turn causes the unitary assembly 14 to pivot about its pivot mounting 19. Of course in the FIG. 2 position as shown and described, the plate 27 is not elevated but instead is down to where it nests with the roller 29 and this would cause the worm 21 to be elevated up out of engagement with the wheel 23, contrary to the engaged position shown in FIG. 1. That is, FIG. 2 actually shows a different setting of the parts, as compared to the showing in FIG. 1.

It will also be noted and understood that the plate 27 has 2 projections 33 attached thereto to move with the rotation of the plate 27, and these projections move into abutment with a pin 34 affixed to a boss 36 on the motor 19. Thus the projections 33 and pin 34 serve to provide stops and the end limit of rotational movement of the plate 27, in both the clockwise and counter-clockwise directions of rotation. Of course the amount of rotation of the plate 27, say from the position shown in FIG. 2, is sufficient to cause the plate notch 28 to move out of engagement with the roller 29 and thus the downward pivotal action of the worm 21 is effected to bring the worm 21 into drive engagement with the worm wheel 23. That is, the circumference 37 of the plate 27 then slides on the cam engager 29 to cause the pivotal action described.

The power source 19 is shown to be a pneumatic motor having a rotor 38 rotatably disposed in the motor eccentric cavity 39 in the usual arrangement of a vane-type motor. Of course the shaft 22 is connected with the rotor 38 for the rotation desired. An air line 41 is connected to the motor 19 and has the necessary passage-way, such as passage-way 42 extending into the motor 19 and to ports, such as ports 43 and 44 in the motor 19. These ports 43 and 44 are on a circular piece 46 which has a stem 47 extending into the boss 26 for rotation with the boss 26 under the influence of the handle 24, The motor also has air passage-ways 48 and 49 which communicate with the motor working chamber for directing the pressurized air into the chamber and thereby rotating the rotor 38. The ports or passage-ways 43 and 44 selectively flow communicate with the passage-ways 48 and 49 upon rotation of the handle 24 to its limit position. That is, as indicated in FIG. 2, if the handle 24 were rotated clockwise, then the port 43 would align with the port 48 and provide the flow of air into the working chamber for driving the motor in one direction. Of course rotation of the handle 24 in the counterclockwise direction would cause alignment of the ports and rotation of the motor in the opposite direction. The ports 43 and 48 and the like are considered powered connections which are placed in operative contact or communication at the limit of the rotation of the handle. Therefore, the motor 19 is not in the operative condition when the handle 24 is initially rotated, but, instead the worm and worm wheel are initially engaged upon initial rotation of the handle, and additional rotation of the handle 24 will then cause the power connections to be operative and thus cause the motor 19 to operate for the desired rotation. Also, the air line 41 has a conventional-type valve or petcock at 51 under the control of a handle 52, so the operator can control the flow of the air through the line 41 and into the motor 19, and he can thus control the speed of the motor by this means. Of course it will also be understood that the motor 19 is substantially conventional design, except for its relationship to the parts described herein, and there would be the usual exhaust passage-ways or lines connected to the motor 19.

While this invention has been shown and described in connection with what is called a machine tool and parts thereof, it will be understood that the particular engagement and drive, of the single handle control type described, can be used for other elements, such as slides which are not commonly called machine tools but which do have the same type of power feeds as required by machine tools. Also, there could be machine tool accessories having this type of drive or power feed mechanism as disclosed herein:

What is claimed is:

1. In a power feed for the table of a machine tool or like of the type having a feed shaft and a driven member on said shaft and a drive member movable into driving engagement with said driven member for rotating said shaft and thereby moving said table of said machine tool, a movable control handle operatively connected with said drive member for moving the latter into driving engagement with said driven member, power means connected to said drive member for powering the latter and being selectively arrangable between an operative and an inoperative condition, the improvement comprising said control handle also being operatively connected with said power means for selectively arranging said power means in said operative and inoperative conditions, respectively, upon movement of said control handle into driving engagement and disengagement of said drive member relative to said driven member.

2. The power feed as claimed in claim 1, wherein said power means includes power-source connections which are movable relative to each other and which are operatively connected with said control handle and which transmit power to said power means only when said connections are in a set position of mutual contact, and wherein said drive member and said driven member are disposed such that the movement of said drive member into driving engagement with said driven member is effected by the movement of said control handle prior to the time that said power-source connections are set into mutual contact by said control handle.

3. The power feed as claimed in claim 2, wherein said control handle is movable in two opposite directions for moving said drive member into engagement with said driven member, and said power-source connections being movable into engagement in response to both said directions of movement of said control handle for respective opposite movement of said drive member and consequent rotation of said feed shaft.

4. The power feed as claimed in claim 3, wherein the movement of said control handle in said one direction movement is an arcuate movement.

5. The power feed as claimed in claim 1, wherein said power means and said driven member are connected together and form a unitary assembly movable as a single unit, and said control handle being connected to said unit and movable in one continuous direction for sequentially engaging said drive member with said driven member and for arranging said power means operable by said unitary movement.

6. The power feed as claimed in claim 5, including a pivot mounting for pivotally mounting said unitary assembly on a pivot axis located intermediate said drive member and said control handle.

7. The power feed as claimed in claim 6, including a cam-type plate rotatable on said unitary assembly, a cam plate engager mounted adjacent said plate for displacing the latter upon rotation of said plate over said engager to pivot said unitary assembly, and said control handle being connected with said plate for rotating the latter.

8. The power feed as claimed in claim 7, wherein said power means includes power-source connections which are movable relative to each other and which are operatively connected with said control handle and which transmit power to said power means only when said connections are in a set position of mutual contact, and wherein said drive member and said driven member are disposed such that the movement of said drive member into driving engagement with said driven member is effected by the movement of said control handle prior to the time that said power-source connections are set into mutual contact by said control handle.

9. The power feed as claimed in claim 8, wherein said cam-type plate is rotatable in two opposite directions, and said power-source connections being disposed for variable mutual contact in respect to the direction of rotation of said plate for powering said drive member in a respective one of two directions of drive.

10. The power feed as claimed in claim 9, including stop means operative on said plate and handle rotation for defining end limits of the rotation, said power-source connections being disposed for mutual contact only at said end limits, and said cam-type plate and said cam plate engager being arranged for fully pivoting said unitary assembly prior to the time said plate reaches either said end limit, so that said drive member is engaged with said driven member before said power means is energized.

11. The power feed as claimed in claim 10, wherein said drive member is a worm gear and said driven member is a worm wheel.

References Cited

UNITED STATES PATENTS 3,490,335   1/1970   King _____ 90—21 R

FOREIGN PATENTS 620,682   10/1935   Germany _____ 90—21 R

FRANCIS S. HUSAR, Primary Examiner

U.S. Cl. X.R.

82—21 A; 90—58 R